United States Patent [19]

Brunnhofer

[11] Patent Number: 5,476,120
[45] Date of Patent: Dec. 19, 1995

[54] LACQUER-RESISTANT FUEL-LINE HOSE

[75] Inventor: Edwin Brunnhofer, Guxhagen, Germany

[73] Assignee: Technoform Caprano + Brunnhofer KG, Fuldabruck, Germany

[21] Appl. No.: 9,459

[22] Filed: Jan. 27, 1993

[30] Foreign Application Priority Data

Jan. 29, 1992 [DE] Germany .................. 42 02 399.8

[51] Int. Cl.⁶ .................................................. F16L 11/00
[52] U.S. Cl. .................. 138/137; 138/103; 138/141; 138/177; 264/209.1
[58] Field of Search ............................ 138/137, 126, 138/140, 141, DIG. 7, 125, 103, 109, 110, DIG. 6, 118, 177; 264/209.1, 173, 241

[56] References Cited

U.S. PATENT DOCUMENTS

| | | | |
|---|---|---|---|
| 3,618,614 | 11/1971 | Flynn | 138/137 |
| 3,741,253 | 6/1973 | Brax et al. | 138/137 |
| 3,762,986 | 10/1973 | Bhuta et al. | 138/137 |
| 3,805,848 | 4/1974 | Chrow | 138/137 |
| 3,904,111 | 9/1975 | Peterson | 138/140 |
| 4,196,464 | 4/1980 | Russell | 138/109 X |
| 4,436,778 | 3/1984 | Dugal | 138/137 |
| 4,643,927 | 2/1987 | Luecke et al. | 138/137 |
| 4,791,765 | 12/1988 | Wynn | 138/137 |
| 4,842,024 | 6/1989 | Palinchak | 138/137 |
| 4,944,972 | 7/1990 | Blembereg | 138/137 |
| 4,948,643 | 8/1990 | Mueller | 138/137 |
| 5,076,329 | 12/1991 | Brunnhoffer | 138/137 |

OTHER PUBLICATIONS

"Plastics—Determination Of Izod Impact Strength Of Rigid Materials" Draft Intern.Standard ISO/DIS 180, Int.Org. for Standardization 1991.

*Primary Examiner*—David A. Scherbel
*Assistant Examiner*—Patrick F. Brinson
*Attorney, Agent, or Firm*—Herbert Dubno; Andrew Wilford

[57] ABSTRACT

A layered tubing for use in a motor vehicle has a thick tubular inner layer formed of one or more sublayers of a synthetic resin having a predetermined hardness and a predetermined thickness and designed for use in a temperature range down to −40° C., and a thin tubular outer crack-absorbing layer bonded externally to and surrounding the inner layer. The outer crack-absorbing layer is formed of a synthetic resin resistant to attach by lacquer solvent over the temperature range of the inner layer and having a hardness equal to at most 0.8 of the hardness of the inner layer and a thickness equal to at most 0.5 of the thickness of the inner layer. When lacquer is intentionally or accidentally applied to such tubing and the tubing subsequently is flexed at extremely low temperatures, the lacquer will crack but the soft outer layer will not transmit the sudden change in shape and energy to the inner layer, causing a crack therein. Instead the soft outer layer will absorb the energy of the crack, leaving the underlying tubing intact and free of cracks.

8 Claims, 1 Drawing Sheet

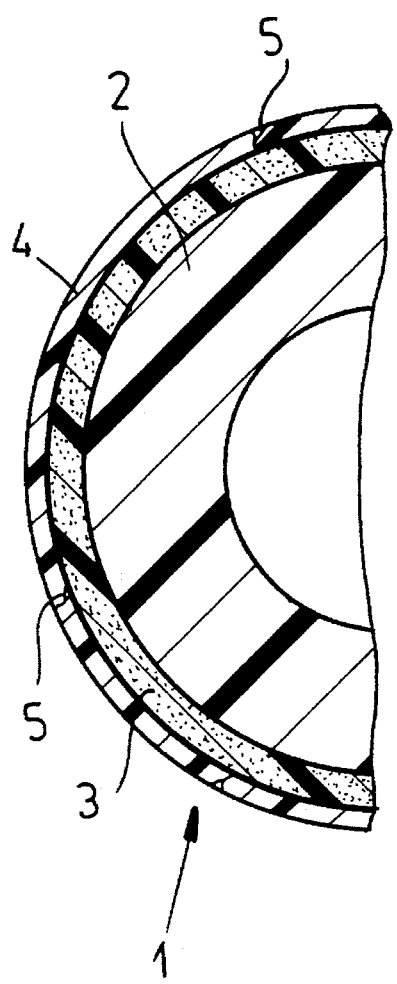
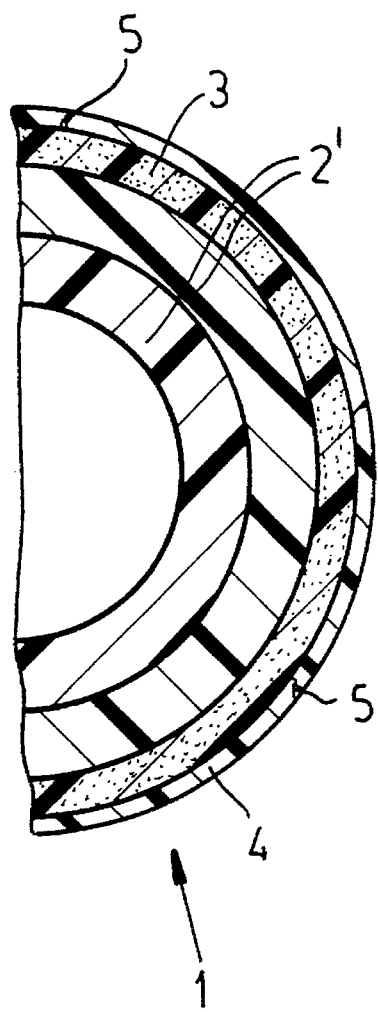
FIG.1            FIG.2
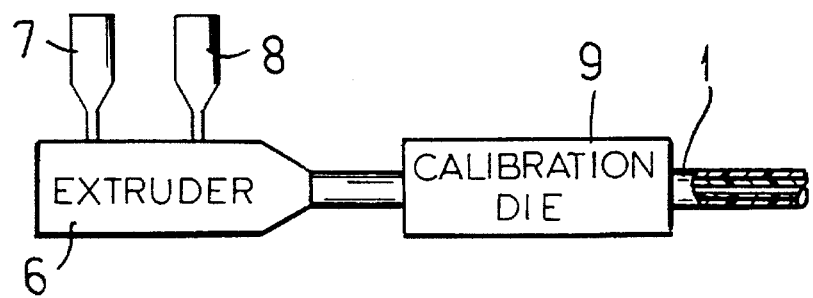
FIG.3

LACQUER-RESISTANT FUEL-LINE HOSE

FIELD OF THE INVENTION

The present invention relates to tubing used in a motor vehicle. More particularly this invention concerns a cold- and lacquer-resistant hose usable as a motor-vehicle fuel line.

BACKGROUND OF THE INVENTION

Tubing used in a motor vehicle as a fuel line, brake line, vacuum line, coolant hose, or the like is typically made of one or more layers of synthetic resin as a fairly stiff tubing or hose. It is designed to have certain predetermined characteristics—hardness, strength, elongation on break, notch impact strength—and can generally be counted on to give good service down to about −40° C. These characteristics are typically determined by selection of the resin making a one-layer tube or the resins in a multilayer one. Reference should be made to U.S. Pat. Nos. 5,076,329 and 5,167,259 as well as to German patent documents 3,715,251 and 3,821,723, all of E. Brunnhofer, for further details.

Typically the last stage of manufacture of such a hose or tube is a calibration step where the tubing moves through a cold vacuum-calibrating die to set its outside diameter to the exact desired size. This step has the side effect of orienting the outer layer of the tube, that is that portion of the tube about 20 μm to 200 μm thick that is directly contacted by the calibrating die. This unfortunately results in an outer layer that is excessively sensitive to cold. Thus when used in extremely frigid surroundings, about −40° C., the hose is subject to cracking.

Thus it has been proposed in European patent application 87 400 666 filed by J. Labalg (based on a French priority of 04 Apr. 1986) to eliminate the orientation of the outer layers of the tube by flame treating the tube. Thus the finished calibrated tube is passed quickly through a flame to heat its outer surface sufficiently to relax any stresses created therein by the calibrating step without softening it enough to actually change its diameter or shape.

Such an additional step is clearly another manufacturing cost that must be added to the cost of making the tube. In addition it is fairly difficult to get the flame-relaxing just right, as too much heat deforms the tube or changes its chemical composition while not enough leaves unwanted stresses in its outer surface.

Another problem with such tubing is that when used in a vehicle that is lacquered, typically with an acrylic lacquer, some of this lacquer gets on the tubing. The lacquer solvent is much more brittle than the tubing, particularly at extremely low temperatures. Thus when the tubing flexes somewhat when very cold, the lacquer cracks and the energy of this cracking is transmitted to the underlying tubing directly under the newly formed crack, forming a crack in this tubing at this location. This is even true in tubing subjected to flame recrystallization as described above.

Objects of the Invention

It is therefore an object of the present invention to provide an improved tubing for use in a motor vehicle.

Another object is the provision of such an improved tubing for use in a motor vehicle which overcomes the above-given disadvantages, that is which does not become crack prone if coated with a motor-vehicle lacquer, in particular one with an acrylic base.

A further object is to provide a method of protecting a motor-vehicle tubing or hose against cracking when painted under cold circumstances.

SUMMARY OF THE INVENTION

A layered tubing for use in a motor vehicle has according to the invention a thick tubular inner layer formed of a synthetic resin having a predetermined hardness and a predetermined thickness and designed for use in a temperature range down to −40° C., and a thin tubular outer crack-absorbing layer bonded externally to and surrounding the inner layer and formed of a synthetic resin resistant to attack by lacquer solvent over the temperature range of the inner layer and having a hardness equal to at most 0.8 of the hardness of the inner layer and a thickness equal to at most 0.5 of the thickness of the inner layer.

Thus, when lacquer is intentionally or accidentally applied to such tubing and the tubing subsequently is flexed at extremely low temperatures, the lacquer will crack but the soft outer layer will not transmit the sudden change in shape and energy to the inner layer, causing a crack therein. Instead the soft outer layer will absorb the energy of the crack, leaving the underlying tubing intact and free of cracks.

The inner crack-absorbing layer can be formed of a plurality of coextruded and coaxial sublayers. In accordance with this invention the inner-layer resin is nylon 6, nylon 66, nylon 46, nylon 69, nylon 610, nylon 612, nylon 6-3T, nylon 11, or nylon 12 as described in part 1 of DIN 16,773, a polypropylene as described in DIN 16,774, a polyethylene terephthalate or polybutylene as described in DIN 16,779, a TEEE polyester elastomer as described in ASTM D 1972, or a mixture thereof. In addition this inner-layer resin has a Shore D hardness between 30 and 85 (determined in accordance with DIN 53505), a strength between $10N/mm^3$ and $60N/mm^3$ (determined in accordance with DIN 53455), an elongation on break of between 30% and 600% (determined in accordance with DIN 53455), and a notch impact strength at −40° C. of 2 $kJ/m^2$ (determined in accordance with ISO 180/1A).

The outer-layer resin according to the invention is nylon 6, nylon 66, nylon 46, nylon 69, nylon 610, nylon 612, nylon 6-3T, nylon 11, nylon 12, a polypropylene, a polyethylene terephthalate or polybutylene, a TEEE Polyester elastomer, or a mixture thereof, as defined in the above DIN and ASTM standards.

The outer-layer thickness is between 0.1 mm and 0.2 mm and the overall tubing wall thickness, including inner and outer layers, is between 0.5 mm and 4 mm. The inner layer resin is nylon 6, nylon 66, nylon 46, nylon 69, nylon 610, nylon 612, nylon 6-3T, nylon 11, nylon 12, a polypropylene, a polyethylene terephthalate or polybutylene, a TEEE polyester elastomer, or a mixture thereof. The tubing has a wall thickness of between 0.5 mm and 4 mm.

BRIEF DESCRIPTION OF THE DRAWING

The above and other objects, features, and advantages will become more readily apparent from the following, reference being made to the accompanying drawing in which:

FIGS. 1 and 2 are cross sections through tubes according to the invention; and

FIG. 3 is a small-scale diagrammatic view illustrating the method of this invention.

SPECIFIC DESCRIPTION

As seen in FIG. 1 a hose 1 is of cylindrically tubular shape and comprises a relatively thick inner layer 2 and a relatively thin outer crack-absorbing layer 3. In FIG. 2, two sublayers 2' take the place of the inner layer 2 of FIG. 1. The outer crack-absorbing layer 3 is substantially thinner and substantially softer than the inner layer 2 or combined inner sublayers 2'. The resins that can constitute these layers include nylon 6, nylon 66, nylon 46, nylon 69, nylon 610, nylon 612, nylon 6-3T, nylon 11, or nylon 12 as described in part 1 of DIN 16,773, a polypropylene as described in DIN 16,774, a polyethylene terephthalate or polybutylene as described in DIN 16,779, a TEEE polyester elastomer as described in ASTM D 1972, or a mixture thereof. In addition this inner-layer resin has a Shore D hardness between 30 and 85, a strength between $10N/mm^3$ and $60N/mm^3$, an elongation on break of between 30% and 600%, and a notch impact strength at $-40°$ C. of $2\ kJ/m^2$.

The tubing 1 thus formed has a wall thickness measured radially of between 0.5 mm and 4 mm and the outer crack-absorbing layer 3 has a thickness measured radially of between 0.1 mm and 0.2 mm.

In addition such tubing 1 may be coated either intentionally or accidentally with an acrylic paint or lacquer 4. When flexed, in particular at the low end of the temperature range which is about $-40°$ C., cracks 5 can form in this lacquer layer 4. As these cracks form they release mechanical energy which is absorbed by the layer 3 and, hence, not transmitted to the underlying tubing layer 2 of 2'. Thus the cracks 5 remain localized in the outer paint layer 4 where they do no harm.

FIG. 3 shows how an extruder 6 fed from a pair of resin supplies 7 and 8 for the respective layers 1 and 2 produces the tube 1 which is then forced through an extrusion die 9. Thus the hose according to the invention is produced continuously.

I claim:

1. A layered tubing for use in a motor vehicle, the tubing comprising:

a thick tubular inner layer formed of a synthetic resin having a predetermined hardness and a predetermined thickness and designed for use in a temperature range down to $-40°$ C.;

a thin coextruded tubular outer crack-absorbing layer bonded externally to and surrounding the inner layer, between 0.1 mm and 0.2 mm thick, formed of a synthetic resin resistant to attack by lacquer solvent over the temperature range of the inner layer and having a hardness equal to at most 0.8 of the hardness of the inner layer and a thickness equal to at most 0.5 of the thickness of the inner layer; and hardened lacquer directly on the outer layer and itself directly exposed to the atmosphere, whereby if the hardened lacquer on the outer layer cracks under cold conditions, the energy of the crack will be absorbed by the outer layer and not transmitted to the inner layer.

2. A layered tubing for use in a motor vehicle, the tubing comprising:

a thick tubular inner layer formed of a plurality of coextruded and coaxial sublayers of synthetic resins each having a predetermined hardness and a predetermined thickness and designed for use in a temperature range down to $-40°$ C.;

a thin coextruded tubular outer crack-absorbing layer between 0.1 mm and 0.2 mm thick, bonded externally to and surrounding the inner layer, formed of a synthetic resin resistant to attack by lacquer solvent over the temperature range of the inner layer, and having a hardness equal to at most 0.8 of the hardness of the inner layer and a thickness equal to at most 0.5 of the thickness of the inner layer; and hardened lacquer directly on the outer layer and itself directly exposed to the atmosphere, whereby if the hardened lacquer on the outer layer cracks under cold conditions, the energy of the crack will be absorbed by the outer layer and not transmitted to the inner layer.

3. The tubing defined in claim 1 wherein the inner layer resin is nylon 6, nylon 66, nylon 46, nylon 69, nylon 610, nylon 612, nylon 6-3T, nylon 11, nylon 12, a polypropylene, a polyethylene terephthalate or polybutylene, a TEEE polyester elastomer, or a mixture thereof.

4. The tubing defined in claim 1 wherein the tubing has a wall thickness of between 0.5 mm and 4 mm.

5. The tubing defined in claim 1 wherein the inner-layer resin has a Shore D hardness between 30 and 85, a strength between $10N/mm^3$ and $60N/mm^3$, an elongation on break of between 30% and 600%, and a notch impact strength at $-40°$ C. of $2\ kJ/m^2$.

6. The tubing defined in claim 1 wherein the outer-layer resin is nylon 6, nylon 66, nylon 46, nylon 69, nylon 610, nylon 612, nylon 6-3T, nylon 11, nylon 12, a polypropylene, a polyethylene terephthalate or polybutylene, a TEEE polyester elastomer, or a mixture thereof.

7. A method of making tubing for use in a motor vehicle, the method comprising the step of:

coextruding a tube consisting of a thick tubular inner layer formed of a synthetic resin having a predetermined hardness and a predetermined thickness and adapted for use in a predetermined temperature range down to $-40°$ C. and a thin tubular outer crack-absorbing layer between 0.1 mm and 0.2 mm thick, bonded externally to and surrounding the inner layer, formed of a synthetic resin resistant to attack by lacquer thinner in the temperature range of the inner layer, and having a hardness equal to at most 0.8 of the hardness of the inner layer and a thickness equal to at most 0.5 of the thickness of the inner layer, whereby, when hardened automotive lacquer on the outer crack-absorbing layer cracks at extremely low temperatures, the energy of the crack is not transmitted by the outer layer to the inner layer;

applying lacquer directly to the outer layer and allowing it to harden, whereby if the hardened lacquer on the outer layer cracks under cold conditions, the energy of the crack will be absorbed by the outer layer and not transmitted to the inner layer.

8. The method defined in claim 7, further comprising the step of:

calibrating the tube by passing it through a calibration die to impart to it a predetermined outside diameter.

* * * * *